United States Patent
Roy et al.

(10) Patent No.: US 10,386,512 B2
(45) Date of Patent: Aug. 20, 2019

(54) SYSTEM AND METHOD FOR PETRO-ELASTIC MODELING

(71) Applicant: CHEVRON U.S.A. INC., San Ramon, CA (US)

(72) Inventors: Prasenjit Roy, Katy, TX (US); Kabilan Krishnamurthy, Perth (AU); Christopher H. Skelt, Houston, TX (US); Joseph P. Stefani, San Ramon, CA (US); Dileep K. Tiwary, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 180 days.

(21) Appl. No.: 15/667,709

(22) Filed: Aug. 3, 2017

(65) Prior Publication Data

US 2018/0038974 A1 Feb. 8, 2018

Related U.S. Application Data

(60) Provisional application No. 62/371,283, filed on Aug. 5, 2016.

(51) Int. Cl.
*G06F 19/00* (2018.01)
*G01V 1/28* (2006.01)
*G01V 1/48* (2006.01)
*G01V 1/50* (2006.01)

(52) U.S. Cl.
CPC ............... *G01V 1/282* (2013.01); *G01V 1/48* (2013.01); *G01V 1/50* (2013.01); *G01V 2210/62* (2013.01); *G01V 2210/624* (2013.01); *G01V 2210/66* (2013.01)

(58) Field of Classification Search
CPC ..... G01V 1/306; G01V 99/005; E21B 43/2401
USPC .......................................................... 702/14
See application file for complete search history.

(56) References Cited

U.S. PATENT DOCUMENTS

| | | |
|---|---|---|
| 7,912,649 B2 | 3/2011 | Harris et al. |
| 8,090,555 B2 | 1/2012 | Dai et al. |
| 8,452,580 B2 | 5/2013 | Strebelle |
| 2009/0192718 A1 | 7/2009 | Zhang et al. |

(Continued)

FOREIGN PATENT DOCUMENTS

WO 2015/171192 A8 12/2015

OTHER PUBLICATIONS

PCT International Search Report and Written Opinion, International Application No. PCT/US2017/045247 dated Feb. 11, 2017, pp. 1-12.

(Continued)

*Primary Examiner* — Edward Raymond
(74) *Attorney, Agent, or Firm* — Marie L. Clapp

(57) ABSTRACT

A method is described for creating a petro-elastic model including receiving, at a computer processor, well log data; computing in situ rock properties; calculating dry frame moduli for a range of porosities based on a rock physics model such as a modified critical porosity model; performing fluid substitutions and computing elastic properties by statistical sampling for the range of porosities; creating a petro-elastic model in a seismic domain; and identifying and producing target hydrocarbon reservoirs based on the petro-elastic model. The method may be executed by a computer system.

7 Claims, 9 Drawing Sheets

(56) References Cited

U.S. PATENT DOCUMENTS

| | | |
|---|---|---|
| 2009/0306899 A1 | 12/2009 | Harris et al. |
| 2015/0247940 A1 | 9/2015 | de Matos Ravanelli et al. |
| 2016/0109593 A1 | 4/2016 | Saxena |
| 2017/0067337 A1* | 3/2017 | Havens .................. E21B 47/16 |

OTHER PUBLICATIONS

Al-Khateb, N., A look into Gassmann's Equation, Geoconvention 2013 Integration, May 26, 2014.

Kumar, D., A Tutorial on Gassmann Fluid Substitution: Formulation, Algorithm and Matlab Code, Geohorizons, Jan. 31, 2006.

P. Avseth et al., Quantitative Seismic Interpretation: Applying Rock Physics Tools to Reduce Interpretation Risk, Cambridge University Press 2005 www.cambridge.org, (http://publishing.cambridge.org/resources/0521816017) pp. 1-13.

M Batzle et al., Seismic properties of pore fluids, Nov. 1992, Geophysics, vol. 57, No. 11 pp. 1306-1408.

A. Nur et al, Critical porosity: A key to relating physical properties to porosity in rocks, Mar. 1998, The Leading Edge, Stanford, CA, pp. 357-362.

\* cited by examiner

SYSTEM AND METHOD FOR PETRO-ELASTIC MODELING

CROSS-REFERENCE TO RELATED APPLICATIONS

This application claims the benefit of U.S. Provisional Patent Application 62/371,283 filed Aug. 5, 2016.

STATEMENT REGARDING FEDERALLY SPONSORED RESEARCH OR DEVELOPMENT

Not applicable.

TECHNICAL FIELD

The disclosed embodiments relate generally to techniques for creating petro-elastic models of subsurface hydrocarbon reservoirs and, in particular, to a method of creating petro-elastic models in the seismic domain based on well data.

BACKGROUND

An important component of hydrocarbon exploration is to infer rock properties (lithology type, porosity, volume of shale, and water saturation) from seismic amplitude based inversion (Avseth et al., 2005). On inverting seismic data for Acoustic Impedance (AI) and $P_{wave}$ velocity-$S_{wave}$ velocity ratio (Vp/Vs), qualitative inference about rock properties at the prospects can be achieved by plotting the inverted seismic data in the Petro-Elastic Model (PEM) grid also known as Rock Physics Template (Avseth et al., 2005). Petro-elastic model grids are built using semi-empirical rock physics models that are calibrated with analog well data. Analog well data is data from wells that have already been drilled in areas believed to have analogous rock properties to the present area of exploration. For example, analog well data may come from an area known to have a similar depositional history (e.g., fluvial) as the present area of exploration.

Petro-elastic model grids are commonly built using rock physics models in the elastic property domain (e.g., cross-plot of AI Vs. Vp/Vs). An important step for reliable inference of rock properties using such PEM grids is calibration to analog well data. This is achieved by heuristically refining modeling parameters of the semi-empirical relationships. The PEM grid is used as template for inferring rock properties from the inverted seismic data (Avseth et al., 2005). Bayesian probability based inference is also commonly used for quantitative inversion (US 20090192718 A1).

Current PEM grids are lacking in the following ways:
1) Starting point of current PEM grids are rock physics models. Calibration to analog well data commonly requires significant tweaking of model parameters. The final choice of model parameters is often arbitrary and not driven by any underlying geological processes.
2) PEM grids are built in the elastic property domain (e.g. P-impedance and Vp/Vs ratio) and requires seismic amplitude data to be inverted for Vp, Vs, and Density. Seismic inversion is a non-trivial process. The first step in commonly used model-based inversion is building an initial layered earth model (background model) with Vp, Vs, and Density values derived from well data for the depth interval to be inverted. In frontier basins with limited well control, biased choice of the background model may lead to un-realistic seismic inversion results.
3) Input to PEM grid points (i.e., Vp, Vs, density) for different porosity values are based on semi-empirical rock physics models. They often fail to account for the underlying geological complexity and local variability of elastic properties as function of rock texture and porosity generation or reduction mechanism leading to an overly simplistic PEM grid.

There exists a need for improved petro-elastic modeling.

SUMMARY

In accordance with some embodiments, a method is disclosed for petro-elastic modeling including receiving, at a computer processor, well log data; computing in situ rock properties; calculating dry frame moduli for a range of porosities; performing fluid substitutions and computing elastic properties for the range of porosities; performing fluid substitutions for the range of porosities; creating a petro-elastic model in a seismic domain; and identifying and producing target hydrocarbon reservoirs based on the petro-elastic model.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of petro-elastic modeling. These embodiments are designed to be of particular use for modeling hydrocarbon reservoirs in frontier exploration areas.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Described herein is a new method for a well-data-based expanded petro-elastic modeling technique in seismic domain that relies on building a robust catalog of rock properties starting from well data and extending the modeling using rock physics models. The PEM grid can be directly used in determining expected seismic amplitudes for changes in porosity, hydrocarbon saturation, thickness, and other reservoir properties of interest (e.g., reservoir net to gross). The PEM grid can guide interpretation of observed seismic amplitude to infer rock properties, allowing identification and delineation of hydrocarbon reservoirs so that hydrocarbons can be produced (i.e., extracted via wells). The method uses good quality analog well data as a starting point and interpolates and/or extrapolates with modified rock physics models to reservoir property extremes creating a wider distribution of elastic properties that is representative of a target geological formation. The present methodology guarantees calibration with analog well data and is particularly helpful in areas with sparse to very sparse well controls with good quality analog well data. Good quality well data allows for broadening the distribution using rock physics models.

Unlike current PEM grids that are built in the elastic domain, the present invention creates the PEM grid in the seismic domain (Seismic amplitude based Near-stack Vs. Gradient crossplot) and infer rock properties directly from seismic amplitude attributes. The present method does not require seismic data to be inverted for elastic properties (AI and Vp/Vs).

Figure 1:
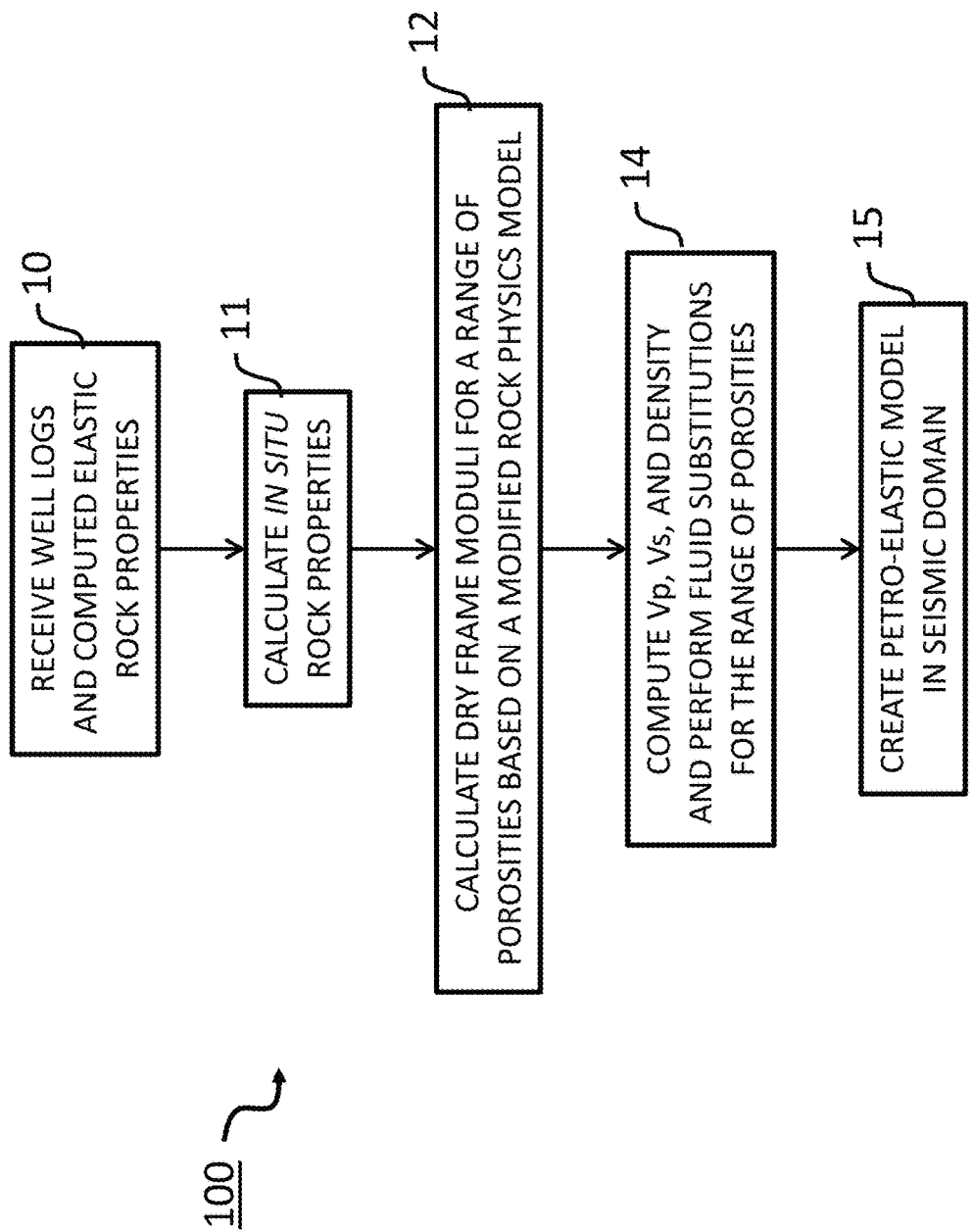
FIG. 1 illustrates a flowchart of a method of seismic imaging including horizon mapping, in accordance with some embodiments.

FIG. 1 illustrates a flowchart of a method 100 for the creation of petro-elastic models by building a well-based expanded PEM grid in the seismic domain. At operation 10, the recorded well logs and computed elastic rock properties from a reservoir interval in the analog well(s) are received. If the target reservoir interval does not have any measured log data, then data from other depth interval with similar geological depositional environment and diagenesis can be detrended to use as input. In an embodiment, the following curves may be received: Vp, Vs, density, Sw (water saturation), fluid content (brine, oil, or gas), lithology, and porosity.

At operation 11, method 100 calculates in situ rock properties including dry frame bulk modulus ($K_{dry}$), shear modulus ($\mu_{dry}$) and matrix density ($\rho_m$) at each depth frame in the analog well dataset using the following expressions:

a. $K_{dry} = \dfrac{K_{sat}\left(\dfrac{\phi K_0}{K_{fl}} + 1 - \phi\right) - K_0}{\dfrac{\phi K_0}{K_{fl}} + \dfrac{K_{sat}}{K_0} - 1 - \phi}$ b. $\mu_{dry} = \mu_{sat}$ c. $\rho_m = \dfrac{\rho_{sat} - \rho_{fl}\phi}{1 - \phi}$ $K_{sat}$: saturated bulk modulus computed from Vp,Vs, and density curves of the analog well data
$K_0$: Hashin-Shtrikman or Voigt-Reuss average mineral bulk modulus
$K_{fl}$: Fluid bulk modulus
$\mu_{sat}$: saturated shear modulus computed from Vs, and density curves of the analog well data
$\rho_{sat}$: saturated reservoir density from Density curve of the analog well data
$\rho_{fl}$: saturated fluid density
$\emptyset$: Reservoir porosity from porosity curve of the analog well data After calculating the in situ rock properties, method 100 continues on to calculate dry frame properties for a range of porosities at operation 12. First, based on the underlying geological process governing porosity change in the reservoir interval, an appropriate modified rock physics model is chosen for calculating additional elastic properties representing a wider distribution of porosity than originally measured for the target reservoir interval. For each depth frame in the analog well dataset, apply one of the modified rock physics models, e.g., modified after Critical Porosity model (Nur et al., 1998) to widen the distribution of porosity and associated elastic properties. The selection of the modified rock physics model is based on the underlying geological mechanism that resulted in changes in porosity for the target reservoir interval. The modified critical porosity model is selected to generate additional elastic properties to simulate compaction and cementation trend related porosity distribution. The modified rock physics models enable data driven rock physics that utilize in situ or measured well data as input for generating additional or synthetic (porosity expanded) elastic data points representing a wider distribution of porosity than otherwise available in the measured well data. The modified rock physics model is used to compute additional dry frame moduli ($K_{dry_i}$, $\mu_{dry_i}$) for a range porosities ($\emptyset_i$) with increments ($\Delta\emptyset$) (e.g., plus or minus 0.02 v/v) with respect to the analog data point porosity ($\emptyset$) as function of in situ dry frame moduli calculated in the previous step at the in situ porosity.

a. $K_{dry_i} = K_0(1 - \emptyset_i/\emptyset_c)f^{\emptyset_i/\emptyset}$; $f = \dfrac{K_{dry}/K_0}{(1 - \emptyset/\emptyset_c)}$ b. $\mu_{dry_i} = \mu_0(1 - \emptyset_i/\emptyset_c)g^{\emptyset_i/\emptyset}$; $g = \dfrac{\mu_{dry}/\mu_0}{(1 - \emptyset/\emptyset_c)}$ $\emptyset_i$: $\emptyset \pm \Delta\emptyset$ (additional porosity points)
$\emptyset_c$: Critical Porosity
$\mu_0$: Hashin-Shtrikman or Voigt-Reuss average mineral shear modulus Other rock physics models may be chosen to simulate a different underlying geological process. This process broadens the reservoir rock property distribution and fills gaps and/or extrapolates creating most relevant rock properties for the target stratigraphic interval.

Referring again to FIG. 1, method 100 next performs operation 14. This operation computes Vp, Vs, and density for the range of additional porosities ($\emptyset_i$) using the dry frame moduli and matrix density computed in the previous step. This may be accomplished using any fluid property calculator, e.g., FLAG (Batzle, and Wang., 1992) for computing fluid modulus ($K_{fl}$) for wet case (100% brine saturated rock) as function of salinity, temperature and pressure.

a. $Vp_i(wet) = \sqrt{\dfrac{K_{sat_i} + 4/3\mu_{sat_i}}{\rho_{sat_i}}}$;

$K_{sat_i} = K_{dry_i} + \dfrac{(1 - K_{dry_i}/K_0)^2}{\emptyset_i/K_{fl} + 1 - \emptyset_i/K_0 - K_{dry_i}/K_0^2}$ -continued b. $Vs_i(wet) = \sqrt{\frac{\mu_{sat_i}}{\rho_{sat_i}}}$; $\mu_{sat_i} = \mu_{dry_i}$;

c. $\rho_{sat_i}(wet) = \rho_m(1 - \emptyset_i) + \rho_{fl}\emptyset$

Using the above set of equations, an embodiment may fluid substitute all data points (analog well data and synthetic) to multiple target saturations m for example, if m=11:

$S_{w_j}$=0%,10%,20%,30%,40%,50%,60%,70%,80%, 90%,100%

This embodiment may use FLAG to estimate hydrocarbon properties and Wood's mixing law for computing fluid modulus ($K_{fl_j}$) at different water saturations for brine-oil and brine-gas mixtures (or other fluid scenarios of interest like secondary gas caps over residual oil or critical gas saturation in an oil column).

Figure 3:
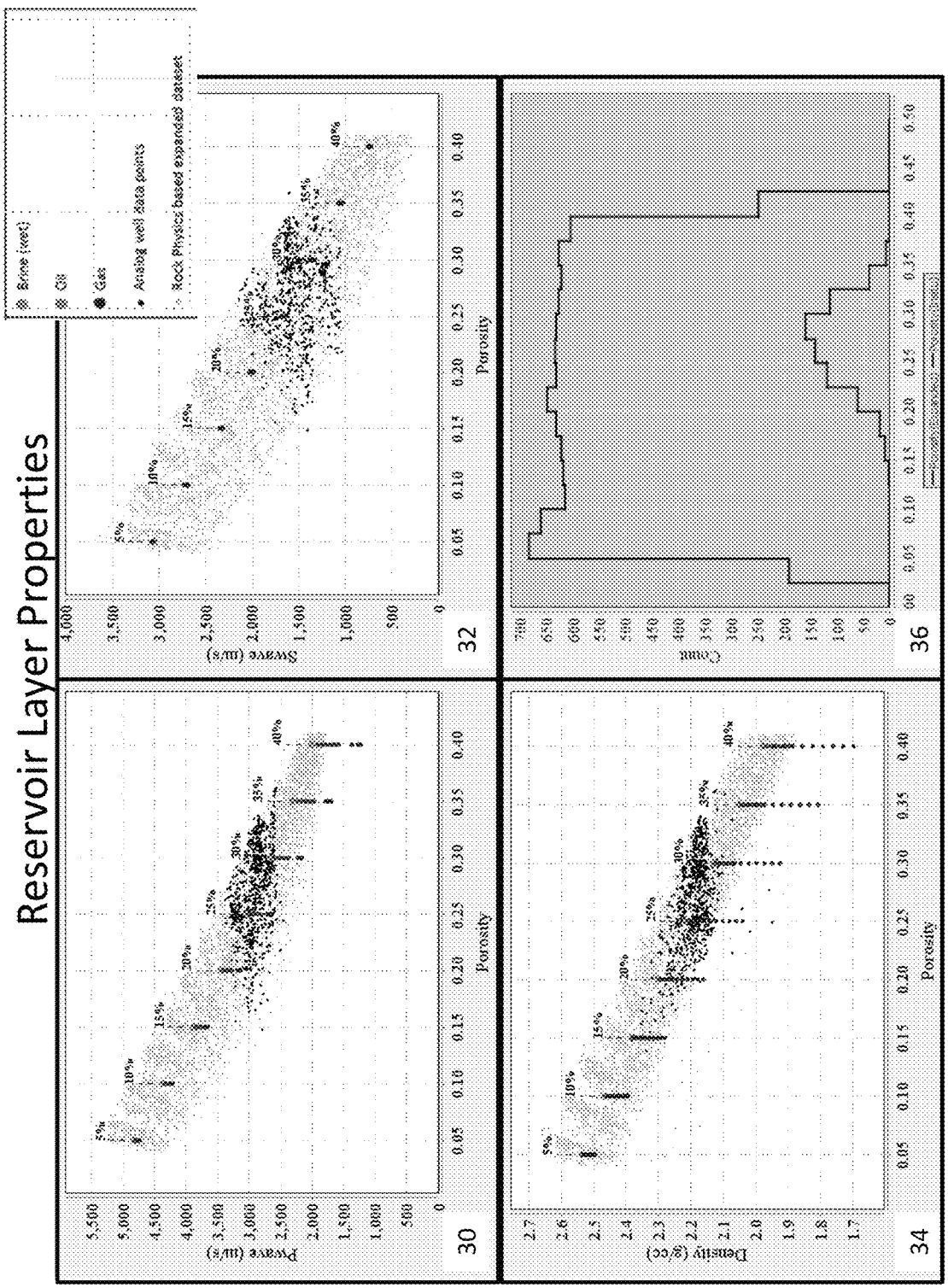
FIGS. 3-9 are slides illustrating aspects of the invention, in accordance with some embodiments.
Figure 4:
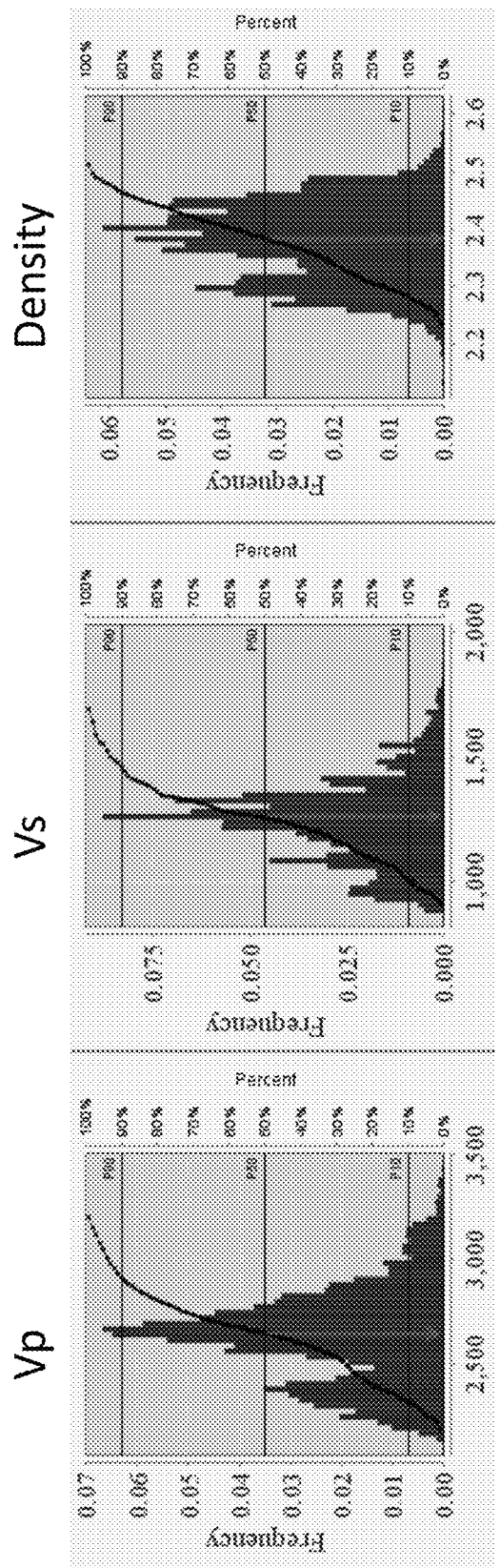
Figure 5:
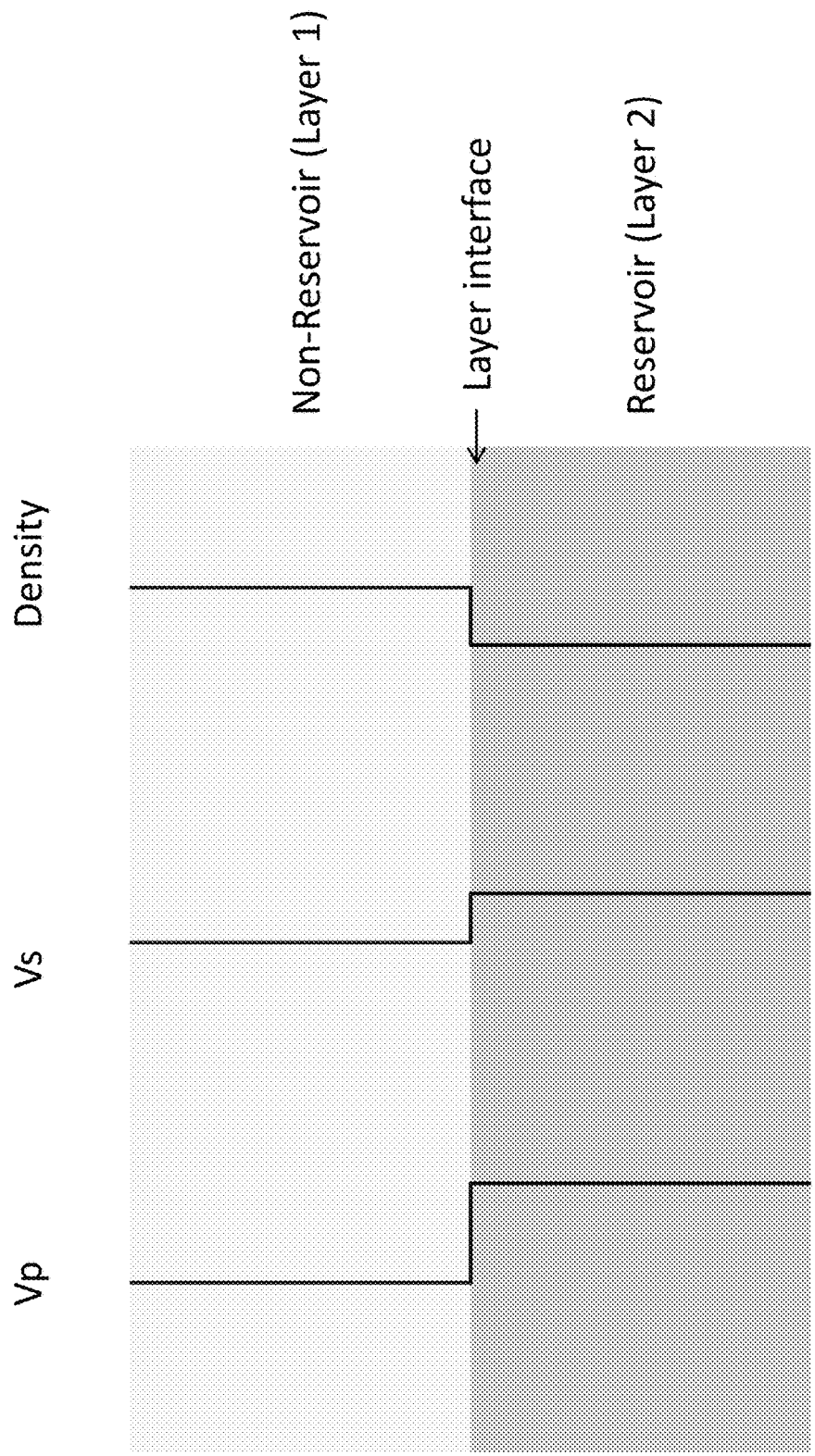
Figure 6:
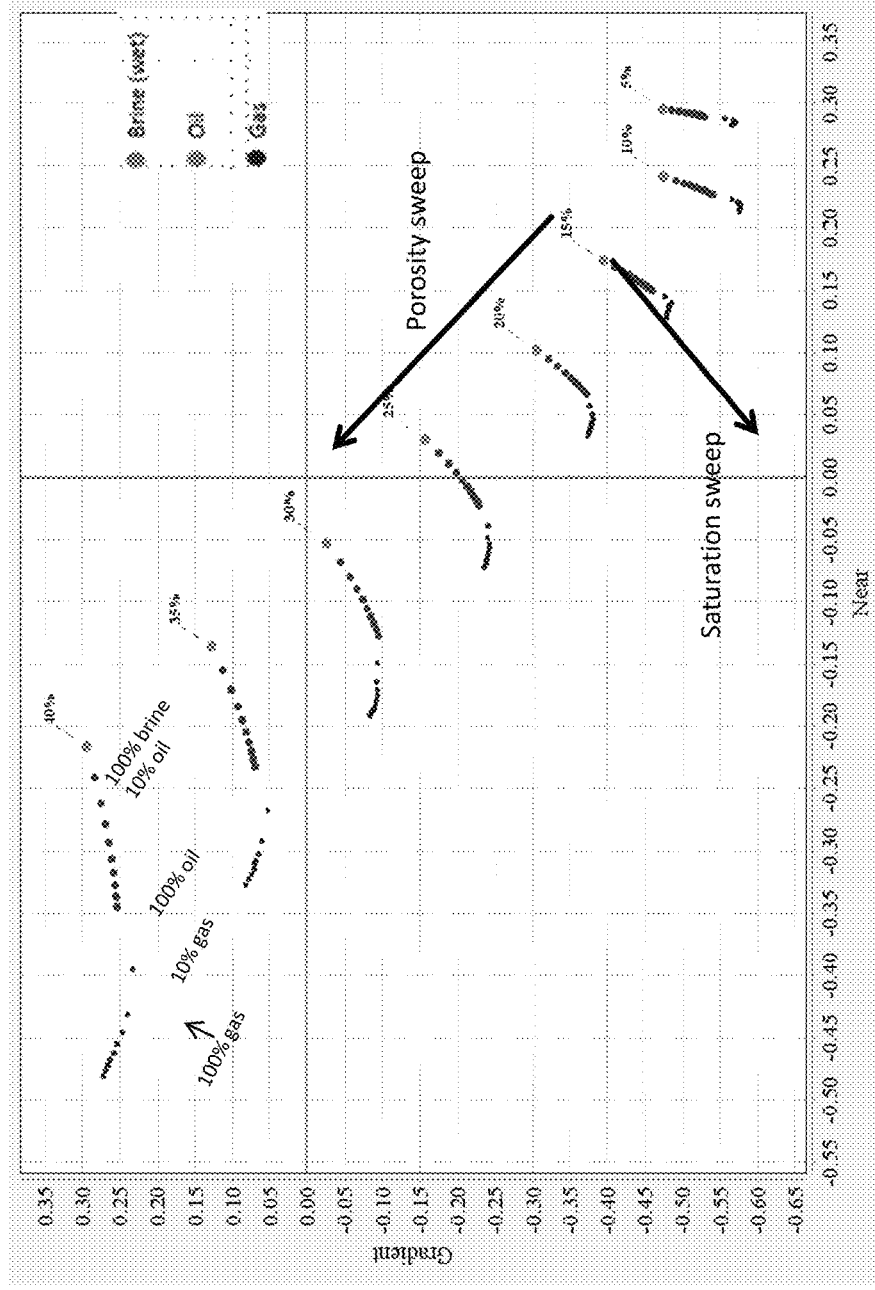
Figure 7:
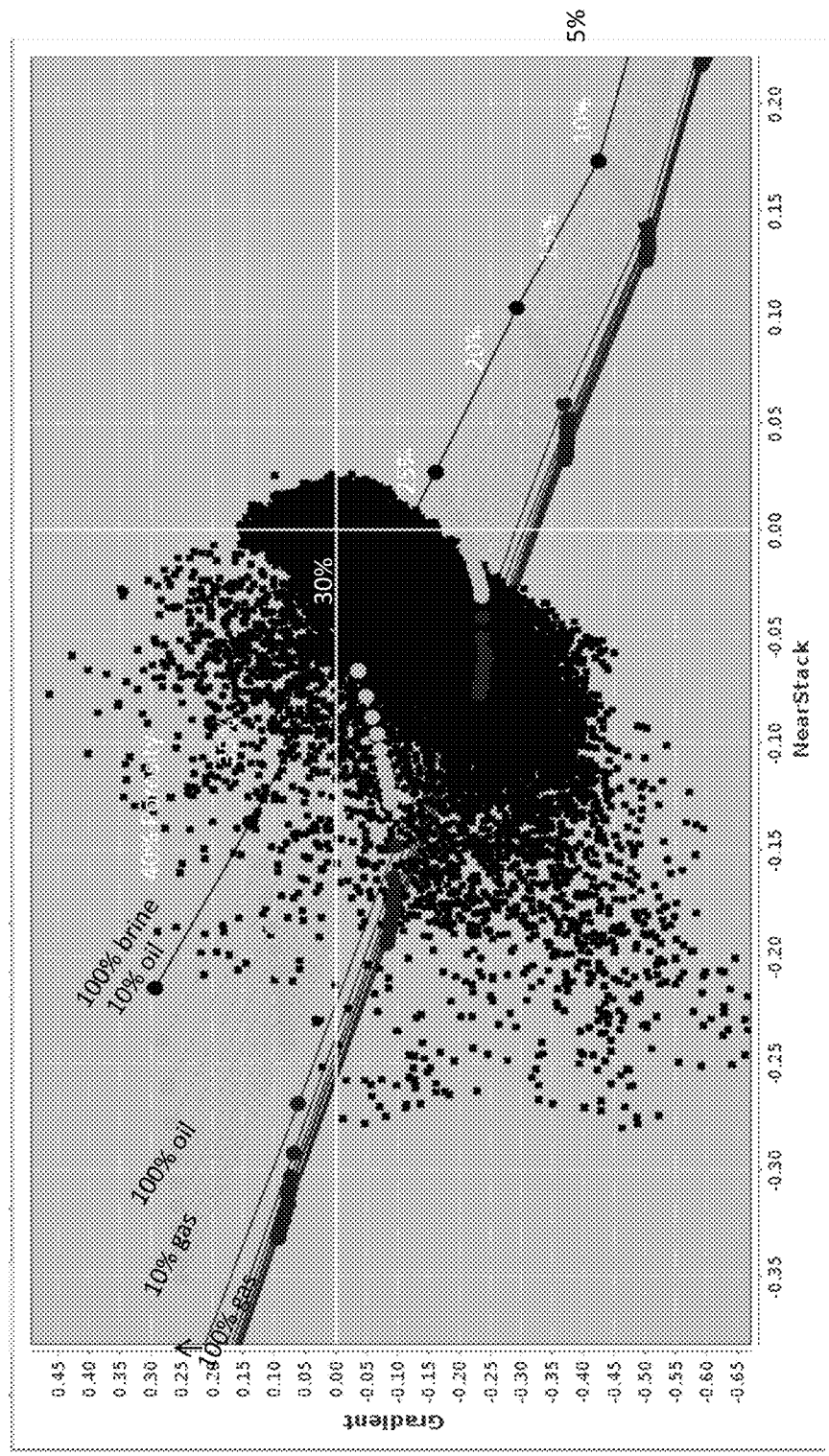
Figure 8:
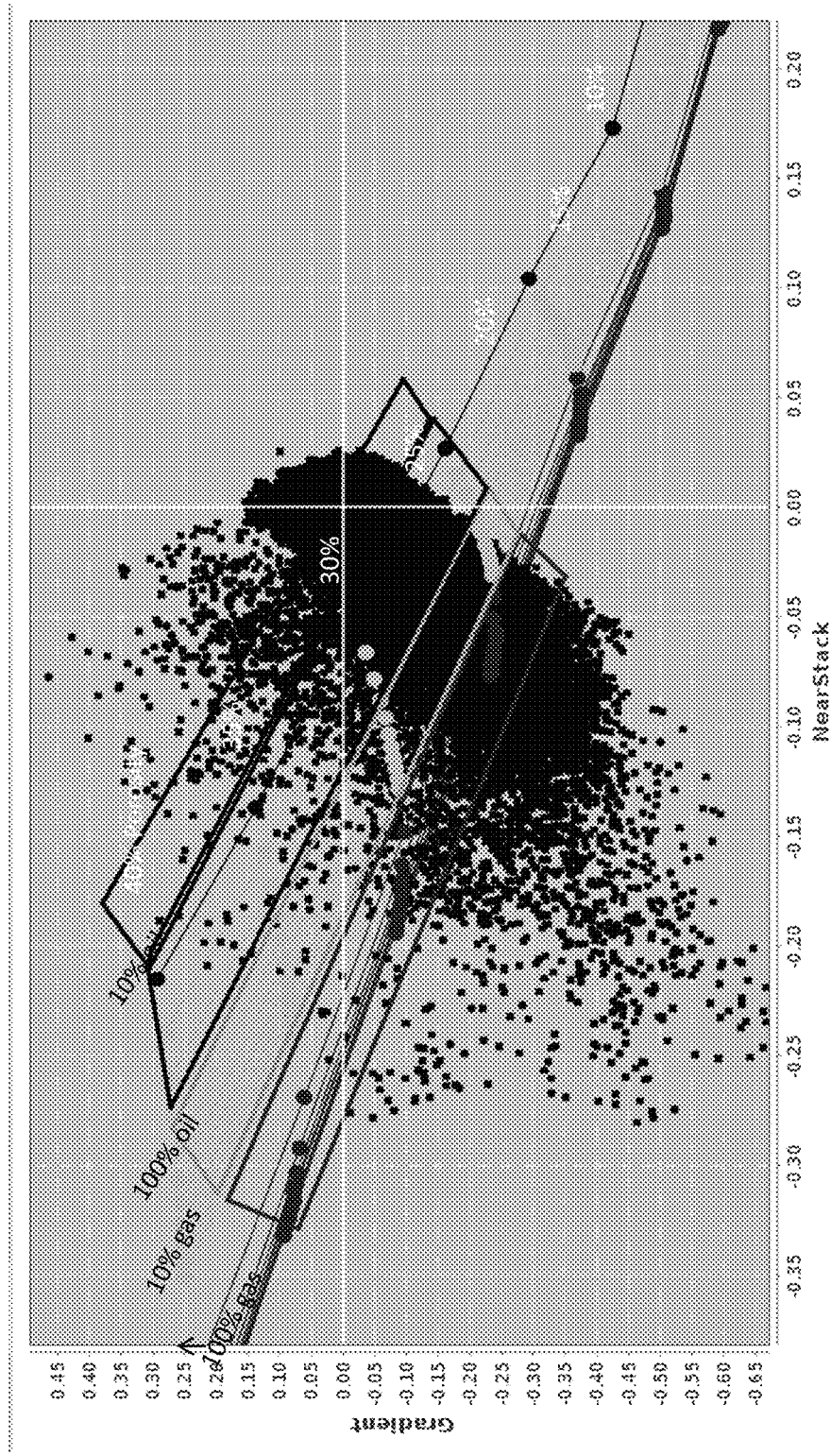
Figure 9:
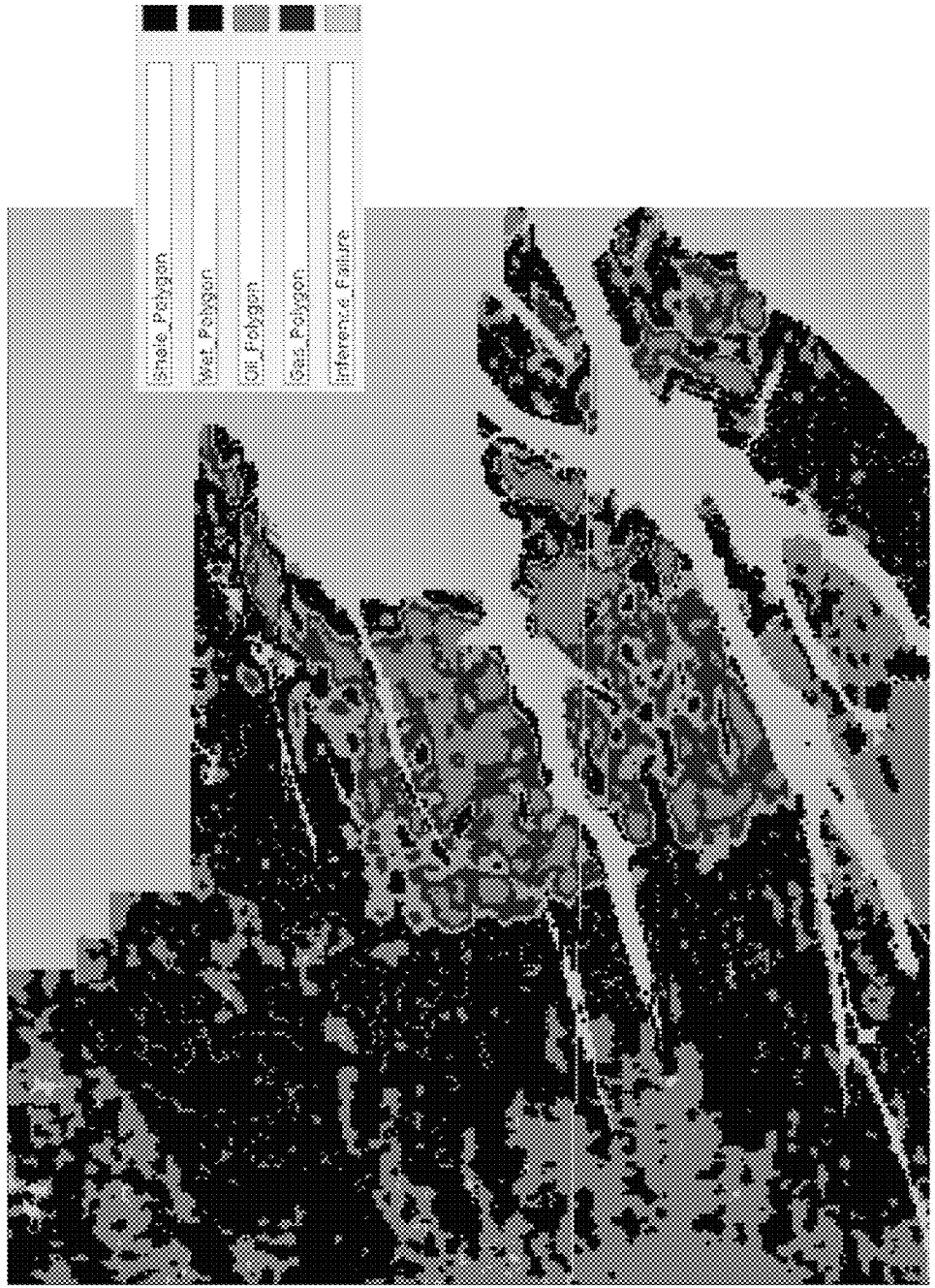

At operation 15, the method 100 creates PEM grid in seismic domain. This may be done by the following:
  a. Reservoir lithology: Compute statistically representative elastic properties by binning Vp, Vs, and Density over small porosity intervals (n porosity bins). Next, compute median values from Vp, Vs, and Density distributions for each porosity bin for the wet and 'm' target saturation cases. This is demonstrated in FIG. 3, where the Vp (Pwave) vs. porosity is shown in panel 30, the Vs (Swave) vs. porosity is shown in panel 32, and the density vs. porosity is shown in panel 34. Panel 36 compares the in situ porosity with the expanded porosity range from the previous steps. Statistical sampling of elastic properties (Vp, Vs, and Density) over small porosity intervals (bins) preserve variability of texture in rocks with various porosities. On the other hand, extrapolation of elastic properties of a single data point does not account for the change in texture associated with different porosities.
  b. Non-reservoir: Compute single value for Vp, Vs, and Density (e.g., median or P20, or P80) for the non-reservoir (e.g., shale) interval overlying target reservoir, as shown in FIG. 4.
  c. Build a two or three layered geological models with non-reservoir over reservoir layer (FIG. 5): A geological model is built by assigning Vp, Vs, and Density values for top and base layers. The top layer Vp, Vs, and Density will have constant value from the non-reservoir interval. For the base layer, each of the "n" porosity points will contribute Vp, Vs, and Density values for 'm' saturation cases from the reservoir layer to build "N" geological models.
  N=n*m; n=number of porosity points, m=number of target saturation cases. All the 'N' models will use same overlying non-reservoir properties.
  d. Forward model: Compute angle dependent reflectivity using Zoeppritz equation and convolve using a wavelet to estimate amplitude at the layer interface (Layer 1 over Layer 2) for all geological models.
  e. Compute seismic attributes based on angle dependent amplitude values at the layer interface (e.g., Near stack, Far stack, and Gradient).
  f. Crossplot any two attributes (e.g., Near stack vs. Gradient) for building the seismic PEM grid (FIG. 6). This grid represents changes in seismic attributes for systematic changes in porosity and gas and oil saturations. This includes data driven statistical sampling of Vp, Vs, and density values for fluid substituted data points binned by combination of the in situ and synthetic (porosity expanded) data points over small porosity intervals. This sampling technique is used to generate statistical and data driven porosity sweeps (changes in amplitude as function of changes in porosity) models for different fluid cases. In FIG. 6, the saturation sweep refers to changing water saturation (Sw).
  g. Inference of hydrocarbon and rock properties from measured seismic 2D or 3D amplitude data using seismic PEM grid:
    i. Input seismic attribute data (Near stack and Gradient): Take near stack and gradient seismic amplitude extracted on the target seismic horizon.
    ii. Seismic calibration: Seismic amplitudes do not have the same range as that of the model driven synthetic amplitudes. Calibration is a standard process to calculate scalars necessary to make seismic amplitude range similar to modeled seismic amplitude range.
    iii. Plot calibrated seismic amplitude attributes in the seismic PEM grid (black points in FIG. 7).
    iv. Use the seismic PEM grid as a template for inferring rock properties
      1. Qualitative interpretation: by plotting polygons in the seismic PEM grid (FIG. 8) to highlight oil and gas prospects in the seismic horizon map (FIG. 9) which are colored by polygon membership.
      2. Quantitative interpretation: Use the PEM grid points for computing relative probability density functions (PDF) and assign relative probability of finding oil, gas, and brine at any x-y locations based on seismic attributes at the location.
  h. The PEM grid can also be used for making quantitative inference on porosity and other rock property of interest. The PEM grid can be extended to three layer models (reservoir layer in between two non-reservoir layers) to account for variability in changes in reservoir thickness (also known as wedge models). By incorporating variation in the reservoir thickness, the PEM grid can be used to infer reservoir thickness. Similarly incorporating variation in net to gross of the reservoir layer, the PEM grid can be used to infer reservoir net to gross.
  i. In another embodiment, the method may use a different non-reservoir property, e.g., P20 or P80 for modeling potential variation in the non-reservoir background.

The present methodology differs from others in the following ways:

1. The starting point for building the PEM grid is elastic rock properties (Vp, Vs, and Density) from analog wells. Others use rock physics models as starting point for building the PEM grid and utilize analog wells for calibration and model parameter selection. In frontier exploration, well data is limited and does not adequately sample full variability of elastic properties that is expected in the target geological formation. The present method uses data driven modified rock physics models creating a wider distribution of elastic properties that are representative of the target geological formation. The present methodology relies on limited but good quality analog well data to better represent observed distributions of rock properties.

2. The petro-elastic model grid is created in the seismic domain. This allows direct analysis of calibrated seismic amplitude attributes from a reservoir section using the PEM grid. Unlike conventional methods, the present method does not require seismic data to be inverted for elastic properties.

3. The present method utilizes data driven statistical sampling of elastic properties (Vp, Vs, and Density) by binning porosity for each fluid cases to generate input for the forward seismic modeling. The grid points in the PEM grid are median values within individual porosity bins for each target saturation that represent statistical distribution of elastic properties within the porosity bins. Unlike other PEM grids, where single "wet" data point is fluid substituted for multiple oil/gas saturations, the present method takes the full distribution of wet data points (analog and synthetic) and fluid substitute all wet points to multiple oil/gas target saturations. After fluid substitution, the present method computes statistical median values for individual porosity bins for each oil/gas saturation and uses the median values. The present method captures the observed underlying trends in the variability of reservoir porosities and target saturations.

Figure 2:
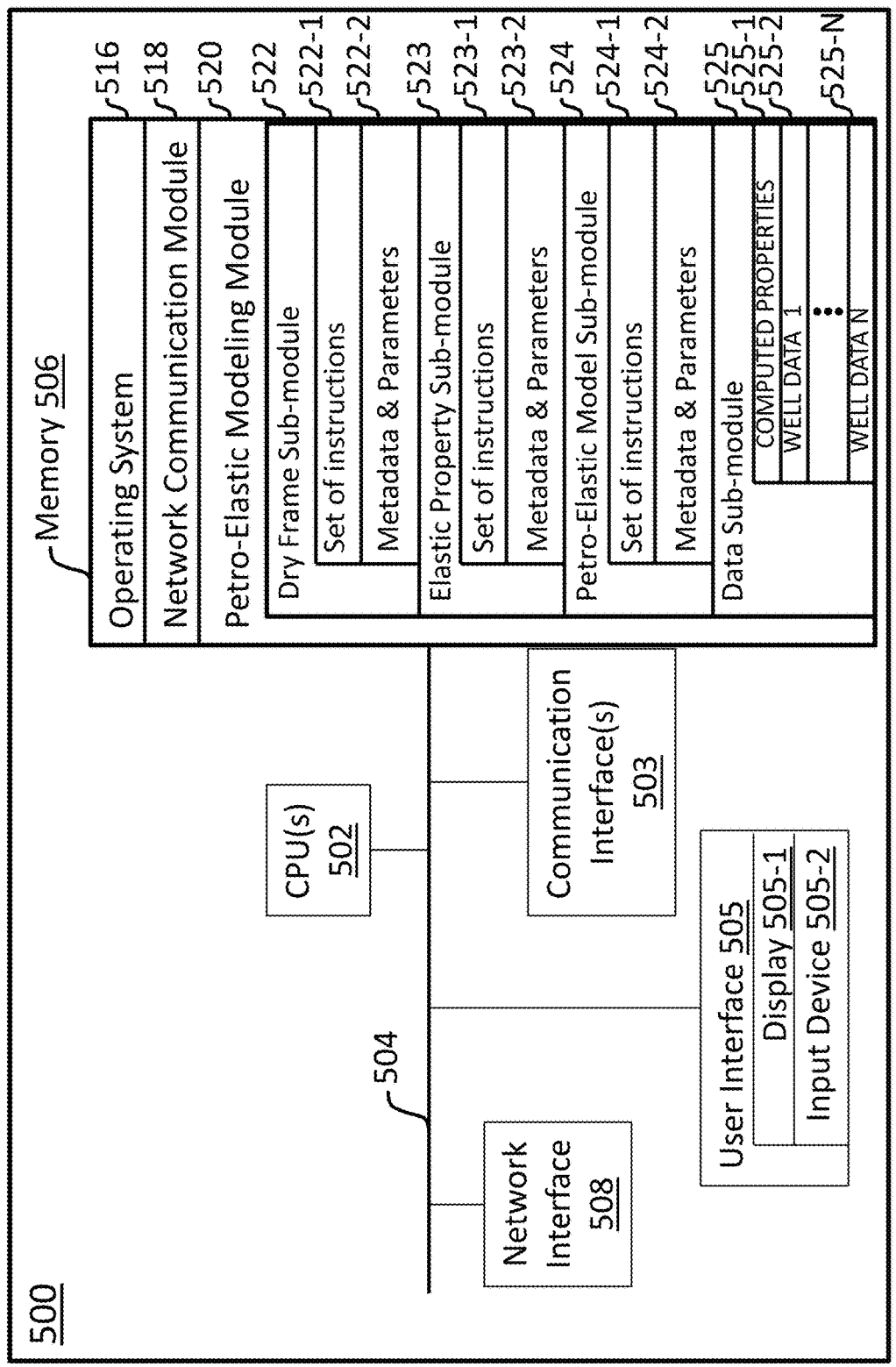
FIG. 2 is a block diagram illustrating a petro-elastic modeling system, in accordance with some embodiments.

FIG. 2 is a block diagram illustrating a petro-elastic modeling system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the petro-elastic modeling system 500 includes one or more processing units (CPUs) 502, one or more network interfaces 508 and/or other communications interfaces 503, memory 506, and one or more communication buses 504 for interconnecting these and various other components. The petro-elastic modeling system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store computed properties, well data, and/or geologic structure information.

In some embodiments, memory 506 or the non-transitory computer readable storage medium of memory 506 stores the following programs, modules and data structures, or a subset thereof including an operating system 516, a network communication module 518, and a petro-elastic modeling module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the petro-elastic modeling module 520 executes the operations of method 100. Petro-elastic modeling module 520 may include data sub-module 525, which handles the computed properties 525-1 and well log data 525-2 through 525-N. This data is supplied by data sub-module 525 to other sub-modules.

Dry frame sub-module 522 contains a set of instructions 522-1 and accepts metadata and parameters 522-2 that will enable it to execute operations 11 and 12 of method 100. The elastic property sub-module 523 contains a set of instructions 523-1 and accepts metadata and parameters 532-2 that will enable it to contribute to operation 14 of method 100. The petro-elastic model sub-module 524 contains a set of instructions 524-1 and accepts metadata and parameters 524-2 that will enable it to execute at least operation 15 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic and well data and generate the petro-elastic model. For example, any of the sub-modules may optionally be able to generate a display that would be sent to and shown on the user interface display 505-1. In addition, any of the data or processed data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 2) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

REFERENCES

Avseth P, Mukerji T, and Mavko G, Quantitative seismic interpretation. Applying rock physics tools to reduce interpretation risk. Cambridge University Press, 2005.

Batzle M, Wang Z, Seismic properties of pore fluids, Geophysics, vol. 57, (1992), p. 1396-1408

Nur, A., Mavko, G., Dvorkin, J., and Galmudi, D., 1998. Critical Porosity: A key to relating physical properties to porosity in rocks, in The Leading Edge, p. 357-362.

US 20090192718 A1: Subsurface prediction method and system.

WO 2015171192 A8: System and method for analyzing geologic features using seismic data

What is claimed is:

1. A computer-implemented method of petro-elastic modeling, comprising:
   a. receiving, at a computer processor, well log data;
   b. computing in situ rock properties;
   c. calculating dry frame moduli for a range of porosities;
   d. performing fluid substitutions and computing elastic properties for the range of porosities to create synthetic data points for the range of porosities;
   e. creating a petro-elastic model in a seismic domain based on the synthetic data points; and
   f. identifying and producing target hydrocarbon reservoirs based on the petro-elastic model.

2. The method of claim 1 wherein the creating the petro-elastic model calculates seismic attributes based on the synthetic data points.

3. The method of claim 1 wherein the synthetic data points for the range of porosities are calibrated to the in situ rock properties.

4. The method of claim 1 wherein the creating the petro-elastic model includes data driven statistical sampling of Vp, Vs, and density values for fluid substituted data points binned by combination of the in situ rock properties and the computed elastic properties for the range of porosities over small porosity intervals to generate statistical and data driven porosity sweep models for different fluid cases.

5. The method of claim 1 wherein the calculating dry frame moduli uses a modified critical porosity model.

6. A computer system, comprising:
   one or more processors;
   memory; and
   one or more programs, wherein the one or more programs are stored in the memory and configured to be executed by the one or more processors, the one or more programs including instructions that when executed by the one or more processors cause the device to:
   a. receive, at a computer processor, well log data;
   b. compute in situ rock properties;
   c. calculate dry frame moduli for a range of porosities;
   d. perform fluid substitutions and compute elastic properties for the range of porosities to create synthetic data points for the range of porosities;
   e. create a petro-elastic model in a seismic domain based on the synthetic data points; and
   f. identify and produce target hydrocarbon reservoirs based on the petro-elastic model.

7. A non-transitory computer readable storage medium storing one or more programs, the one or more programs comprising instructions, which when executed by an electronic device with one or more processors and memory, cause the device to
   a. receive, at a computer processor, well log data;
   b. compute in situ rock properties;
   c. calculate dry frame moduli for a range of porosities;
   d. perform fluid substitutions and compute elastic properties for the range of porosities to create synthetic data points for the range of porosities;
   e. create a petro-elastic model in a seismic domain based on the synthetic data points; and
   f. identify and produce target hydrocarbon reservoirs based on the petro-elastic model.

* * * * *